United States Patent [19]

Hara et al.

[11] Patent Number: 5,544,635
[45] Date of Patent: Aug. 13, 1996

[54] SPARK-IGNITION ENGINE AND A METHOD OF ADAPTIVE CONTROL ON THE IGNITION TIMING THEREOF

[75] Inventors: Hiroaki Hara; Haruo Komoriya, both of Saitama, Japan

[73] Assignees: Cosmo Research Institute; Cosmo Oil Co., Ltd., both of Tokyo, Japan

[21] Appl. No.: 337,524

[22] Filed: Nov. 9, 1994

[30] Foreign Application Priority Data

Nov. 12, 1993 [JP] Japan .................................. 5-307266

[51] Int. Cl.⁶ .................................................. F02P 5/153
[52] U.S. Cl. ............................................................ 123/425
[58] Field of Search ...................................... 123/419, 425

[56] References Cited

U.S. PATENT DOCUMENTS

| | | | |
|---|---|---|---|
| 4,800,500 | 1/1989 | Tanaka | 123/425 |
| 4,892,074 | 1/1990 | Iriyama | 123/425 |
| 4,920,494 | 4/1990 | Abo et al. | 123/425 |
| 5,014,670 | 5/1991 | Mitsumoto | 123/425 |
| 5,058,552 | 10/1991 | Shimomura et al. | 123/425 |
| 5,070,842 | 12/1991 | Inoue et al. | 123/425 |
| 5,107,813 | 4/1992 | Inoue et al. | 123/425 |
| 5,153,834 | 10/1992 | Abo et al. | 123/425 |
| 5,359,883 | 11/1994 | Baldwin et al. | 123/425 |

*Primary Examiner*—Willis R. Wolfe
*Attorney, Agent, or Firm*—Sughrue, Mion, Zinn, Macpeak & Seas

[57] ABSTRACT

A spark-ignition engine that has a cylinder and a crank connected to the piston in the cylinder and which converts the reciprocating motion of the piston to rotary motion via the crank, characterized in that said engine further includes:

an angle sensor for measuring the crank angle;

a combustion sensor for measuring the burned mass fraction of a fuel in the combustion chamber;

a computing unit for calculating the ignition timing of the spark-ignition engine on the basis of the measured crank angle and burned mass fraction by the following equation: $Y=aX+b$ (where Y is the ignition timing expressed by the crank angle before top dead center; X is the difference between the crank angle at a reference burned mass fraction of the fuel injected into the cylinder and the crank angle at a burned mass fraction in the progress of combustion; a and b are constants determined by the characteristics of the spark-ignition engine); and a control unit for controlling the ignition timing of the spark ignition engine on the basis of the calculated ignition timing. Also, disclosed is a method for adaptive control of the ignition timing on the basis of the equation $Y=aX+b$.

6 Claims, 6 Drawing Sheets

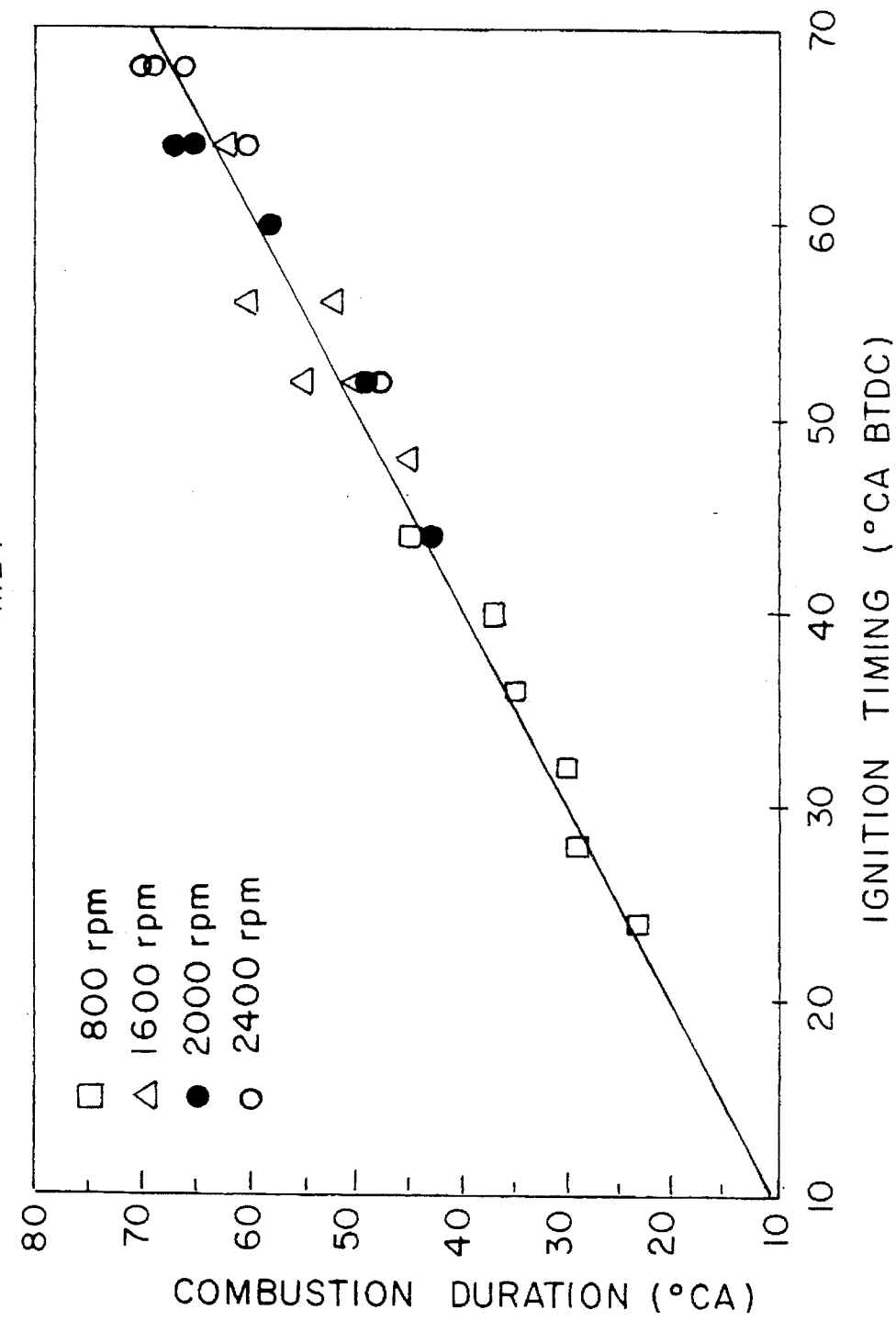

SPARK-IGNITION ENGINE AND A METHOD OF ADAPTIVE CONTROL ON THE IGNITION TIMING THEREOF

FILED OF THE INVENTION

This invention relates to a spark-ignition engine, more particularly, to a spark-ignition engine that is furnished with a mechanism capable of adaptive control on its ignition timing. The invention also relates to a method of adaptive control on the ignition timing of a spark-ignition engine. The term "spark-ignition engine" as used herein covers reciprocating internal combustion engines including two- or four-stroke cylinder engines.

BACKGROUND OF THE INVENTION

If the ignition timing of a spark-ignition engine is too early, combustion occurs prematurely and the ascending piston is pushed down. On the other hand, if the ignition timing is too late, combustion occurs belatedly and the combustion pressure will act when the piston has descended by a large extent and no effective work is done.

Under these circumstances, active studies are being conducted to optimize the ignition timing of spark-ignition engines from various viewpoints such as improving the engine output and fuel economy and promoting the efficiency of rendering emissions harmless, thereby contributing to clean environments and energy conservation.

Theoretically, an optimum timing for igniting spark-ignition engines is defined as the point of time when the crank angle has reached a minimum spark advance for best torque (which is hereunder abbreviated as MBT for simplicity) and it is best to ignite at that point of time from the viewpoints of output and fuel economy. The term "minimum spark advance for best torque" (MBT) as used herein means the crank angle that corresponds to the ignition timing where a maximum torque can be produced without knock.

With conventional spark-ignition engines, the ignition timing is adjusted to MBT by first calculating the crank angle corresponding to MBT using various means and then controlling the ignition timing either mechanically or electronically. For example, JP-A-56-165772 discloses an apparatus for adjusting the ignition timing of an engine using a mixture of alcohol and gasoline as a fuel. (The term "JP-A" as used herein means an "unexamined published Japanese patent application".) The apparatus comprises a sensor for detecting the concentration of alcohol in the mixed fuel and a control unit for adjusting the ignition timing on the basis of the output of the alcohol sensor. This apparatus will accelerate the ignition timing if the concentration of alcohol is above a preset level.

JP-A-1-193079 discloses an invention according to which the change in the rotational speed of an engine is regarded as a motion of uniform angular acceleration and the ignition timing is calculated on the basis of the period between two successive reference crank positions, whereby ignition is done at an optimal time that is associated with a specific state of engine running. JP-A-1-193079 also discloses a method of electronically controlling the timing of ignition of gasoline engines that enables ignition to be done at an optimal time that is associated with a specific state of engine running even if its rotational speed is varying.

However, the conventional methods for optimizing the timing of igniting spark-ignition engines are not completely satisfactory and have had various problems. For example, the apparatus for adjusting the ignition timing as disclosed in JP-A-56-165772, supra, has the limitation that it is only applicable to the case where the concentration of alcohol is near a specified or standard value and an optimal output cannot always be produced if fuels having sub-standard gasoline/alcohol concentrations are used. The method as disclosed in JP-A-1-193079, supra, has the problem that it is not necessarily capable of control for an optimal ignition timing if two fuels having different characteristics such as octane number or burning velocity are used, as exemplified by the case of using a gasoline of high octane number and a regular gasoline.

The present inventors conducted further studies and experiments on the basis of those prior art techniques and have finally found that an optimal ignition timing, or the ignition timing at which a spark-ignition engine produces a maximum thermal efficiency, is a linear function of a certain specified factor and independent of the kind of fuel, A/F ratio, air intake and the rotational speed of the engine.

SUMMARY OF THE INVENTION

The present invention has been accomplished to solve the aforementioned problems of the prior art means for adaptive control over the ignition timing of spark-ignition engines and it has as an object providing a spark-ignition engine furnished with a means capable of optimizing the ignition timing of a spark-ignition engine regardless of the kind of fuel used.

Another object of the invention is to provide a method for adaptive control on the ignition timing of a spark-ignition engine.

The first object of the invention can be attained by a spark-ignition engine that has a cylinder and a crank connected to the piston in the cylinder and which converts the reciprocating motion of the piston to rotary motion via the crank, characterized in that said engine further includes:

an angle sensor for measuring the crank angle;

a combustion sensor for measuring the burned mass fraction of a fuel in the combustion chamber;

a computing unit for calculating the ignition timing of the spark-ignition engine on the basis of the measured crank angle and burned mass fraction by the following equation:

$$Y=aX+b$$

(where Y is the ignition timing expressed by the crank angle before top dead center; X is the difference between the crank angle at a reference burned mass fraction of the fuel injected into the cylinder and the crank angle at a burned mass fraction in the progress of combustion; a and a are constants determined by the characteristics of the spark-ignition engine); and a control unit for controlling the ignition timing of the spark-ignition engine on the basis of the calculated ignition timing.

The second object of the invention can be attained by a method for adaptive control on the ignition timing of a spark-ignition engine that has a cylinder and a crank connected to the piston in the cylinder and which converts the reciprocating motion of the piston to rotary motion via the crank, characterized in that said method comprises the steps of:

measuring the crank angle with an angle sensor capable of crank angle measurement;

measuring the burned mass fraction of the fuel in the combustion chamber with a combustion sensor capable of burned mass fraction measurements;

calculating the ignition timing of the spark-ignition engine on the basis of the measured crank angle and burned mass fraction by the following equation:

$$Y = aX + b$$

(where Y is the ignition timing expressed by the crank angle before top dead center; X is the difference between the crank angle at a reference burned mass fraction of the fuel injected into the cylinder and the crank angle at a burned mass fraction in the progress of combustion; a and b are constants determined by the characteristics of the spark-ignition engine); and controlling the ignition timing of the spark-ignition engine on the basis of the calculated ignition timing.

BRIEF EXPLANATION OF THE DRAWINGS

FIG. 6 is a graph constructed in Experiment 3 by plotting the relationship between MBT (°CA) and the angular displacement of the crankshaft that occurred in the period from 0 to 10% change of the burned mass fraction.

DETAILED DESCRIPTION OF THE INVENTION

The present invention will now be described in detail.

To begin with, let us outline the results of experiments conducted by the present inventors to find that the optimal ignition timing is a linear function of a specified factor.

EXPERIMENT 1

A single-cylinder engine with a displacement of 403 cc (AVL type 530) was selected as a testing engine and changed over so that it could be operated with lean fuel-air mixtures. The engine was equipped with a pressure sensor to allow for measurement of the pressure in the combustion chamber.

Figure 2:
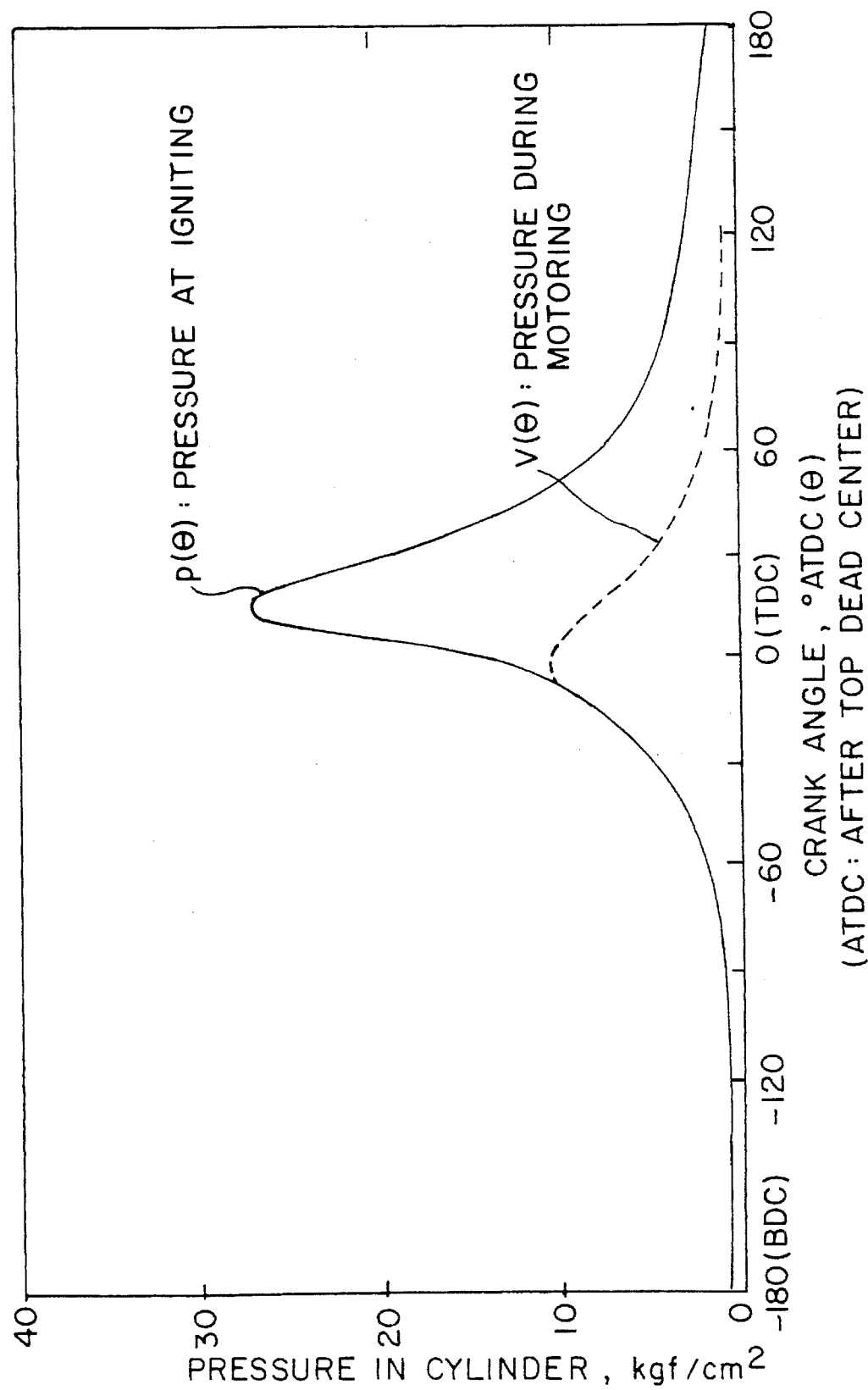
FIG. 2 is a graph showing the relationship between the crank angle and the pressure in cylinder.
Figure 3:
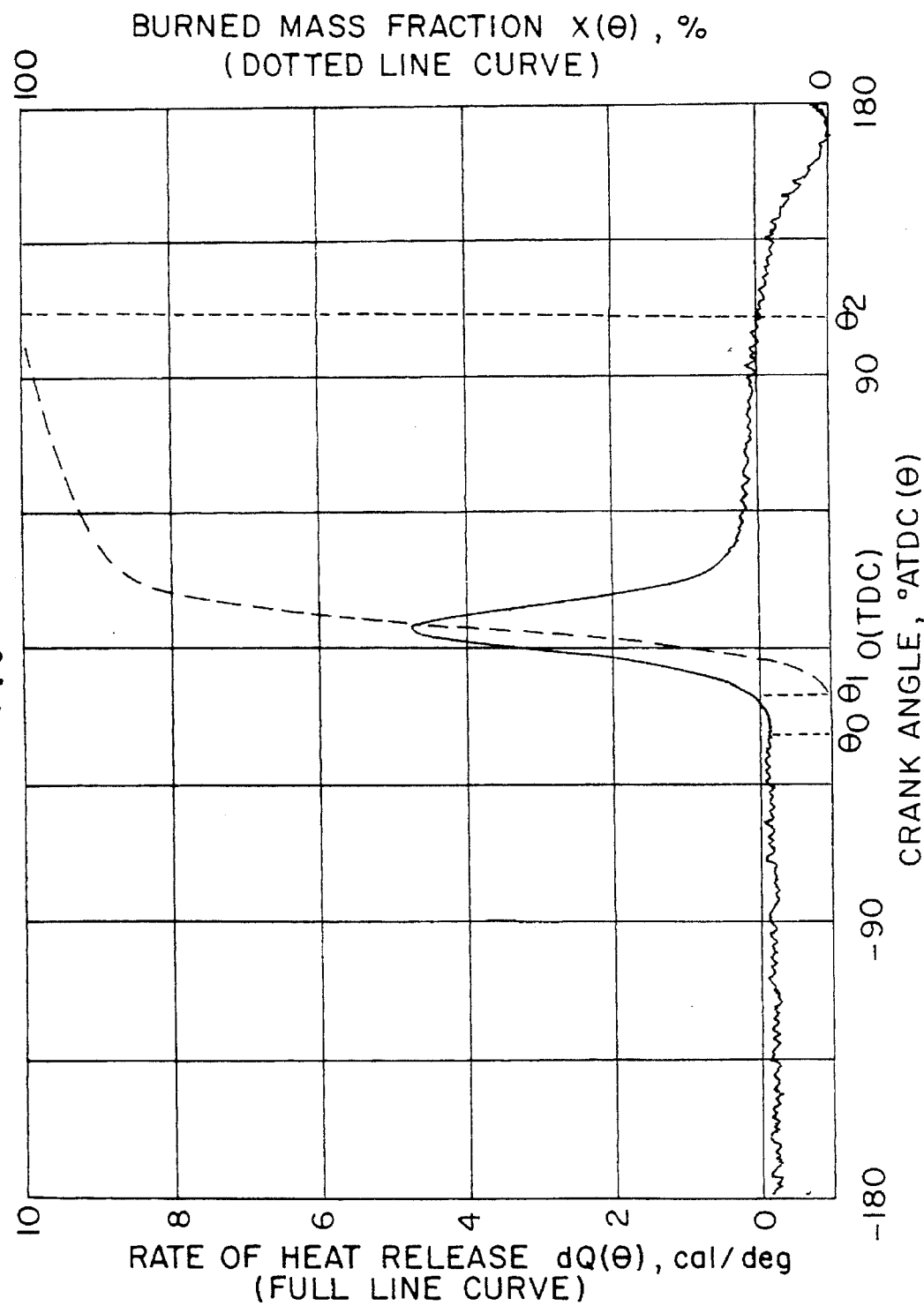
FIG. 3 is a graph showing the relationship among the crank angle, the rate of heat release and the burned mass fraction.

Graphs were constructed as shown in FIGS. 2 and 3 so that the burned mass fraction of the fuel injected into the cylinder could be calculated from the measured pressure in the combustion chamber. This permits the calculation of the displacement of the crank angle that occurred in the period from a certain reference burned mass fraction, say, 0% (at ignition), to a certain stage of the progress of combustion indicated by a certain burned mass fraction, say, 10%. In other words, the combustion duration required for the burned mass fraction to change from 0% to 10% is expressed by the displacement of crank angle (°CA). This concept was applied to Experiment 1, in which the time taken for the burned mass fraction to change from 0% to 10% was set as the combustion duration and the displacement of crank angle that occurred in that period was calculated.

The horizontal axis of the graph in FIG. 2 plots the crank angle and the vertical axis plots the pressure in cylinder. From FIG. 2, one can read $V(\theta)$, or the pressure in the combustion chamber during motoring (no igniting), as well as $p(\theta)$, or the pressure at igniting.

The horizontal axis of the graph in FIG. 3 plots the crank angle and the vertical axis plots the rate of heat release and the burned mass fraction, whereby the relationship among the crank angle, the rate of heat release and the burned mass fraction is shown in FIG. 3. Symbol $\theta_0$ refers to the crank angle at igniting, $\theta_1$ the crank angle at which the chemical energy released by combustion was greater than the heat transfer to the chamber wall, and $\theta_2$ the crank angle at which the heat transfer to the chamber wall was greater than the chemical energy released by combustion. The period between $\theta_0$ and $\theta_1$ is generally referred to as "ignition delay".

The burned mass fraction of a fuel that corresponds to a measured pressure is calculated from the measured pressure data entered into a computing unit and the specific calculating procedure is as follows. First, $P(\theta)$, or the average combustion pressure is measured for a given number of cycles. $P(\theta)$ is expressed by the following equation:

$$P(\theta) = \frac{1}{N} \sum_{i=1}^{i=N} (p(\theta))_i$$

where $\theta$ is 0 to 720 (for four-stroke engine), representing the period from a compression top dead center ($\theta=0$) to the next compression top dead center, and N is the number of cycles (or measurements). Similarly, $V(\theta)$ is measured preliminarily. $V(\theta)$ is expressed by the following equation:

$$V(\theta) = \frac{1}{N} \sum_{i=1}^{i=N} (v(\theta))_i$$

It should be noted that $V(\theta)$ may be calculated from the changes in the cylinder volume at various crank angles on the basis of the values of the bore and stroke of the piston and the offset of the connecting rod.

In the next step, $dQ(\theta)$, or the rate of heat release for each crank angle (see FIG. 3) is calculated by the following equation:

$$dQ(\theta) = A/(\kappa-1) \cdot (V(\theta) \cdot dP(\theta) + \kappa \cdot P(\theta) \cdot dV(\theta))$$

where A is the thermal equivalent of work (1/J, kcal/kg·m) and $\kappa$ is the ratio of specific heats.

Subsequently, the ignition and extinction angles are determined from the calculated rate of heat release. The ignition angle $\theta_1$ is the crank angle at which the rate of heat release makes a negative to positive transition and the extinction angle $\theta_2$ is the crank angle at which the rate of heat release makes a positive to negative transition. They are indicated by the respective symbols in FIG. 3.

At the same time, the quantity of heat release in the period from the ignition to the extinction is determined by simple addition according to the following equation:

$$Q = \sum_{\theta=\theta_1}^{\theta=\theta_2} dQ(\theta) \text{ kcal}$$

Finally, the following equation is used to calculate the burned mass fraction $X(\theta)$ shown in FIG. 3:

$$X(\theta)=dQ(\theta)/Q \times 100\%$$

In FIG. 3, the dotted line curve represents the values of burned mass fraction at various crank angles.

Using the modified engine and fueling it with pure products of six hydrocarbons (isooctane, benzene, toluene, 1-hexene, 2,4,4-trimethylpentene (DIB) and cyclohexane), a combustion test was conducted with varying A/F ratios as the engine was operated at 1,200 rpm and at an air intake pressure of 660 mmHg. In the test, the engine was operated with the ignition timing was varied for each fuel and for each value of A/F ratio. For each ignition timing, the combustion duration (°CA) required for the burned mass fraction to change from 0% to 10% under various engine operating conditions and the engine output were determined from the measured values of pressure in the combustion chamber. The thus obtained data were processed to determine MBT, or the ignition timing at which a maximum torque could be produced without knock, and its correlation with the combustion duration required for the burned mass fraction to change from 0% to 10% given that ignition timing was also determined.

Figure 4:
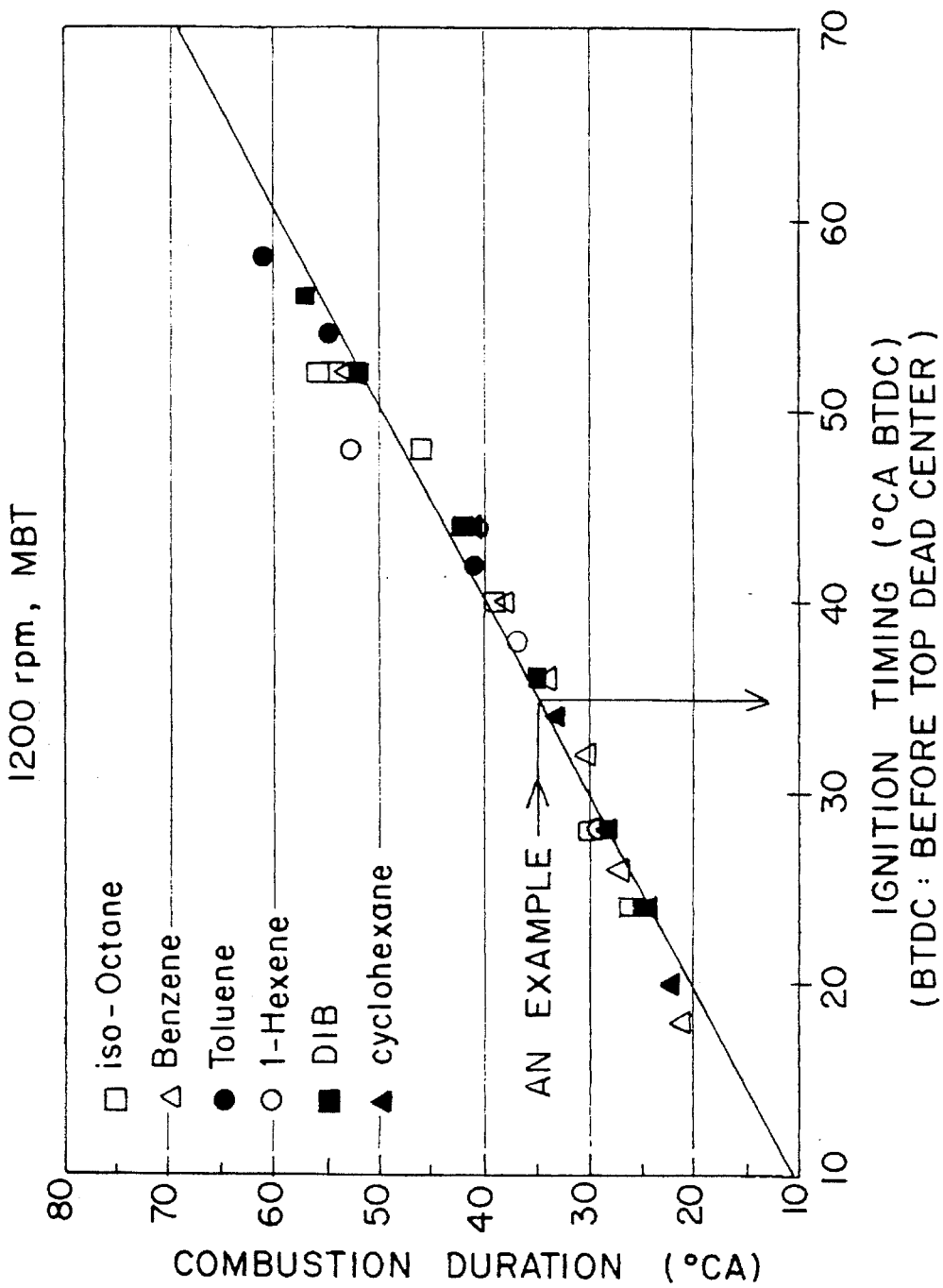
FIG. 4 is a graph constructed in Experiment 1 by plotting the relationship between MBT (°CA) and the angular displacement of the crankshaft that occurred in the period from 0 to 10% change of the burned mass fraction.

The results are shown in FIG. 4; obviously, MBT had a linear relationship with the combustion duration (°CA) required for the burned mass fraction of a fuel to change from 0% to 10% and the relationship was independent of the type of fuel and A/F ratio.

The vertical axis of the graph in FIG. 4 plots the combustion duration (°CA) required for the burned mass fraction of a fuel sample to change from 0% to 10%, and the horizontal axis plots MBT as ignition timing (°CA BTDC, Before Top Dead Center). The A/F ratio increases from left to right in the graph.

EXPERIMENT 2

A combustion test was conducted under the same conditions as in Experiment 2, except that the fuels were replaced by the following oxygen-containing organic compounds; methanol, ethanol, methyl tertiary butyl ether (MTBE) and an equimolar mixture of furan an benzene (Furan 50).

Figure 5:
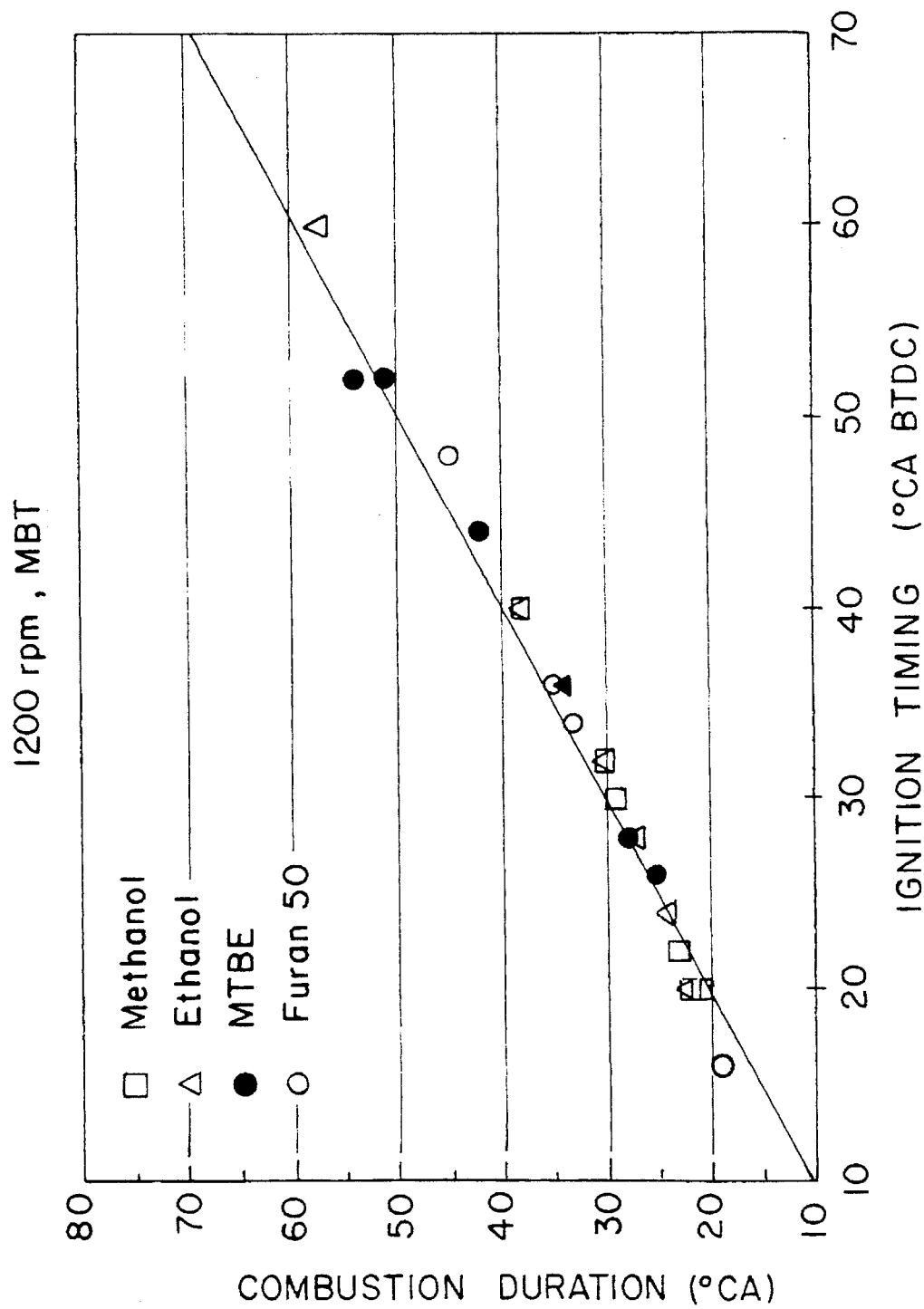
FIG. 5 is a graph constructed in Experiment 2 by plotting the relationship between MBT (°CA) and the angular displacement of the crankshaft that occurred in the period from 0 to 10% change of the burned mass fraction.

The results are shown in FIG. 5; obviously, MBT had a linear relationship with the combustion duration (°CA) required for the burned mass fraction of a fuel to change from 0% to 10% and the relationship was independent of the type of fuel and A/F ratio. The notation for the graph in FIG. 5 is the same as in FIG. 4.

EXPERIMENT 3

A combustion test was conducted under the same conditions as in Experiment 1, except that pure products of two hydrocarbons (isooctane and benzene) were used as fuels and that the air intake pressure, A/F ratio and the ignition timing were varied as the engine was operated at 800 rpm, 1,600 rpm, 2,000 rpm and 2,400 rpm.

The results are shown in FIG. 6; obviously, MBT had a linear relationship with the combustion duration (°CA) required for the burned mass fraction of a fuel to change from 0% to 10% and the relationship was independent of the type of fuel, A/F ratio, the engine speed (rpm) and the air intake pressure. The notation for the graph in FIG. 6 is the same as in FIG. 4.

The present inventors continued their experimentation to check whether MBT would have a linear relationship with the combustion duration even if the reference burned mass fraction of a fuel was taken at a non-zero value (e.g., 10%) and when the time required for the fuel combustion to proceed to a certain burned mass fraction (e.g., 90%) was taken as the combustion duration. The results were linear relationships of the same profiles as shown in FIGS. 4, 5 and 6.

Based on the experimental results described above, the present inventors noted that an optimal ignition timing (i.e., igniting at MBT) had a linear relationship with the combustion duration (°CA) required for the burned mass fraction of a fuel to change from a desired reference value to a desired value in the progress of combustion and that this linear relationship was independent of the type of fuel, A/F ratio, the engine speed (rpm) and the air intake pressure. The inventors also found that the linear relationship was solely dependent on the characteristics of the engine under consideration. The present invention has been accomplished on the basis of these findings.

According to one aspect, the present invention provides a spark-ignition engine that has a cylinder and a crank connected to the piston in the cylinder and which converts the reciprocating motion of the piston to rotary motion via the crank, characterized in that said engine further includes:

an angle sensor for measuring the crank angle;

a combustion sensor for measuring the burned mass fraction of a fuel in the combustion chamber;

a computing unit for calculating the ignition timing of the spark-ignition engine on the basis of the measured crank angle and burned mass fraction by the following equation:

$$Y=aX+b$$

(where Y is the ignition timing expressed by the crank angle before top dead center; X is the difference between the crank angle at a reference burned mass fraction of the fuel injected into the cylinder and the crank angle at a burned mass fraction in the progress of combustion; a and b are constants determined by the characteristics of the spark-ignition engine); and a control unit for controlling the ignition timing of the spark-ignition engine on the basis of the calculated ignition timing.

According to another aspect, the present invention provides a method for adaptive control on the ignition timing of a spark-ignition engine that has a cylinder and a crank connected to the piston in the cylinder and which converts the reciprocating motion of the piston to rotary motion via the crank, characterized in that said method comprises the steps of:

measuring the crank angle with an angle sensor capable of crank angle measurement;

measuring the burned mass fraction of the fuel in the combustion chamber with a combustion sensor capable of burned mass fraction measurements;

calculating the ignition timing of the spark-ignition engine on the basis of the measured crank angle and burned mass fraction by the following equation:

$$Y=aX+b$$

(where Y is the ignition timing expressed by the crank angle before top dead center; X is the difference between the crank angle at a reference burned mass fraction of the fuel injected into the cylinder and the crank angle at a burned mass fraction in the progress of combustion; a and b are constants determined by the characteristics of the spark-ignition engine); and controlling the ignition timing of the spark-ignition engine on the basis of the calculated ignition timing.

In the equation set forth above, the reference burned mass fraction may be selected at a desired percentage and this is also true with the value to be taken by the burned mass fraction in the progress of combustion. Preferably, the reference burned mass fraction is selected at 0% (igniting) and the burned mass fraction in the progress of combustion is selected at 10%. The term "burned mass fraction" as used herein is defined as the percentage of the burned mass of the fuel divided by the mass of the injected fuel.

Coefficients a and b are constant that are determined by the characteristics of the engine, such as the compression ratio, swirl ratio and the presence or absence of a supercharger or a turbo charger. They may also vary with changes in the range of the burned mass fraction. To determine constants a and b, the following empirical procedure may be adopted: an engine is subjected to a combustion test with varying fuel type, A/F ratio, engine speed (rpm) and air intake pressure and a graph of the same profile as shown in FIG. 4 or 5 is constructed.

The equation set forth above is also independent of the type of fuel, A/F ratio, air intake pressure and engine speed (rpm), and the same values of constants a and b can be applied to any spark-ignition engines of the same model irrespective of their operating conditions.

In accordance with the present invention, the crank angle and the burned mass fraction of the fuel in the combustion chamber of the engine are measured at all times irrespective of whether the engine is fueled with a gasoline of high octane number or a regular gasoline, and an optimal ignition timing is calculated on the basis of the equation set forth above, whereby feedback control is performed on the ignition timing.

Since the effectiveness of the present invention is independent of the type of fuel, it is advantageously applicable not only to the case where existing gasoline engines are changed over to otherwise fueled engines such as LPG engines, CNG engines or methanol engines, but also to the flexible fuel vehicles (FFV) which can run on both gasoline and methanol.

The combustion sensor for use in the invention is in no way limited as long as it is capable of rapid measurement of the burned mass fraction of a fuel in the combustion chamber of the cylinder, and any commercial sensors can be used, as exemplified by various means that depend on the measurement of the radical luminous intensity with fiber optics, the measurement of the position of a flame with an ion probe, and the measurement of the combustion temperature with a thermometer. As will be described in the following example, a pressure sensor such as a piezoelectric transducer (e.g., either integral with the spark plug or in the form of a washer for the spark plug) may alternatively be used as a combustion sensor to measure the pressure in the combustion chamber of the cylinder and the burned mass fraction of the fuel in accordance with the measured pressure in the combustion chamber may be calculated on the basis of a known relationship between the pressure in the combustion chamber and the burned mass fraction of the fuel.

With multi-cylinder engines, it is not absolutely necessary to provide a combustion sensor on all cylinders and it may be provided on selected cylinders only. Combustion sensors may be provided in any position as long as they are capable of detecting the burned mass fraction; for instance, they may be provided on the cylinder head, cylinder liner, the top of the piston or any other suitable locations.

The crank angle sensor for use in the invention is in no way limited as long as it is capable of detecting the crank angle and any commercial angular sensors may be used. The detection point also is not limited as long as the crank angle can be detected, and the sensor may be fitted on the crankshaft, distributor or any other locations that permit easy detection. If the engine is already equipped with a crank angle sensor, this may be used for the purpose of the invention.

The control unit to be used in the invention may be part of an engine control circuit if the latter is already installed on the engine.

The present invention comprises an angle sensor for measuring the crank angle, a combustion sensor for measuring the burned mass fraction of a fuel injected into a cylinder, a computing unit for calculating an optimal ignition timing of a spark-ignition engine by the specified equation on the basis of the measured crank angle and burned mass fraction, and a control unit for controlling the ignition timing of the spark-ignition engine on the basis of the calculated ignition timing. Using this feedback circuit, the invention will control the ignition timing of the spark-ignition engine to MBT in a manner independent of the operating conditions such as the engine speed (rpm), the type of fuel, A/F ratio and the intake pressure.

By controlling the ignition timing of the spark-ignition engine to MBT, the output of the engine is increased as accompanied by improvements in the thermal efficiency and fuel economy regardless of the type of fuel used in the engine. Since the control method of the invention is independent of the fuel type, there is offered an added advantage in that best fuel economy is assured at all times irrespective of gasoline composition. Furthermore, the control method can advantageously be used with flexible fuel vehicles (FFV) which are designed to run on both gasoline and methanol.

The concept of the invention, which is independent of the operating conditions of engines such as the engine speed (rpm), fuel type, A/F ratio and air intake pressure, is general-purpose and can be applied extensively to a variety of spark-ignition engines.

The present invention is described below in greater detail with reference to an example and accompanying drawings.

Figure 1:
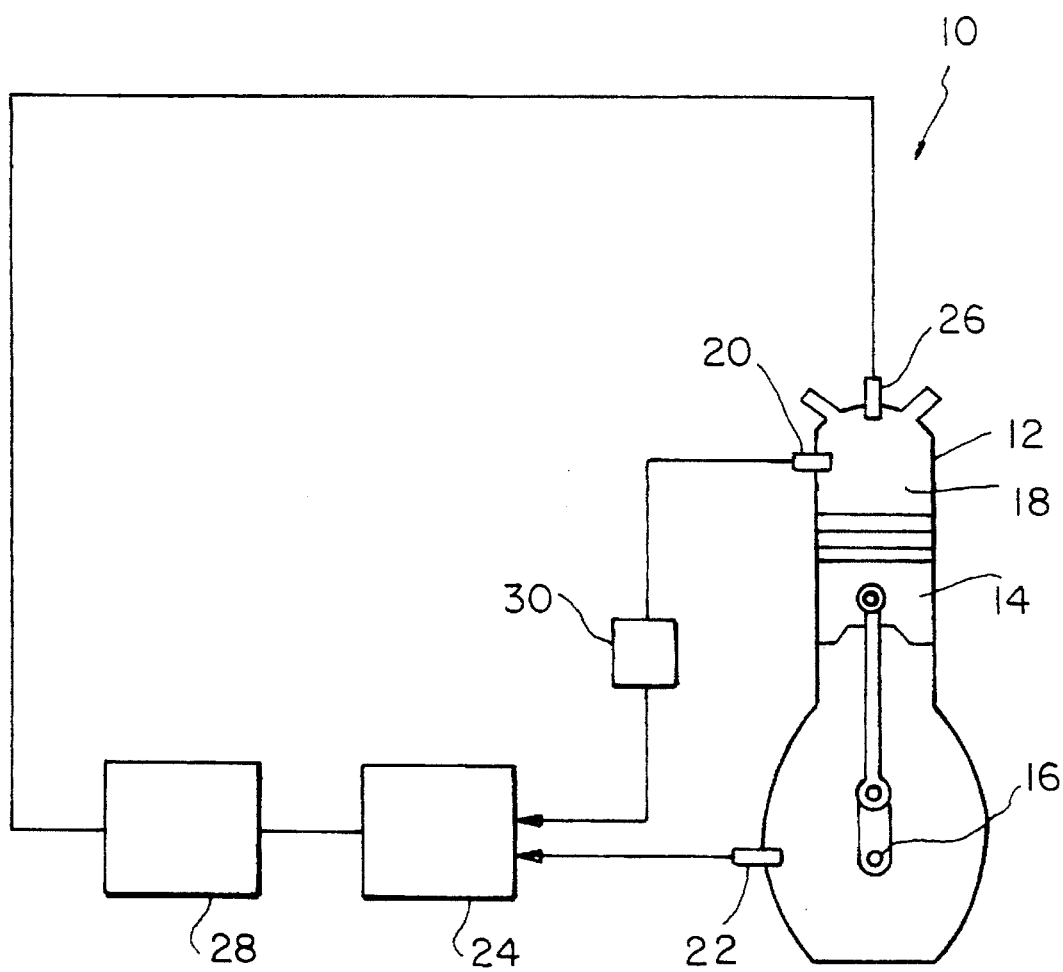
FIG. 1 is a schematic diagram of an example of the spark-ignition engine according to the first aspect of the invention.

FIG. 1 is a schematic diagram showing the essential part of an example of the spark-ignition engine according to the first aspect of the invention. The spark-ignition engine indicated by 10 in FIG. 1 is a four-stroke reciprocating internal combustion engine and comprises a cylinder 12, a piston 14 reciprocating in the cylinder 12, and a crankshaft 16 connected to the piston 14. An air inlet, a fuel supply system and all other parts that are not directly concerned with the present invention are omitted from FIG. 1.

The spark-ignition engine 10 is also furnished with a mechanism for controlling the ignition timing that comprises a pressure sensor 20 mounted on a combustion chamber 18 for measuring the pressure in that chamber, an angle sensor 22 for measuring the angle of the crankshaft 16, a computing unit 24, and a control unit 28.

In accordance with preliminarily constructed relationships such as those depicted in FIGS. 2 and 3, the computing unit 24 calculates the burned mass fraction of a fuel at the pressure signaled by the pressure sensor 20 and, furthermore, calculates an ignition timing (MBT) for a preset combustion duration (the difference between the crank angle at a reference burned mass fraction setting for the fuel injected into the cylinder and the crank angle at a burned mass fraction setting in the progress of combustion) by the equation $Y=aX+b$. The thus calculated ignition timing Y is optimal for the spark-ignition engine of interest.

Control unit 28 controls the igniting timing of a spark plug 26 on the basis of the ignition timing calculated by the computing unit 24. Shown by 30 in FIG. 1 is an amplifier of the signal from the pressure sensor 20. Both the pressure sensor 20 and the angle sensor 22 are commercially available.

We now describe the operation of the mechanism for controlling the ignition timing of the spark-ignition engine 10. The pressure sensor 20 and the angle sensor 22 measure the pressure in the combustion chamber 18 and the angle of crankshaft 16, respectively, either continuously or intermittently at given intervals, and each measured value is immediately supplied into the computing unit 24.

Upon receipt of the input pressure value, the computing unit 24 calculates the corresponding burned mass fraction of the fuel in accordance with preliminarily constructed relationships such as those depicted in FIGS. 2 and 3. The computing unit 24 then calculates the difference between the crank angle at a reference burned mass fraction, say, 0% (igniting) which may be expressed by $K_0$ °CA, and the crank angle at a predetermined burned mass fraction, say, 10% which may be expressed by $K_{10}$ 20 CA; in other words, the computing unit 24 calculates the displacement of the crank angle at the two burned mass fractions. This angular displacement, K °CA, is X in the equation $Y=aX+b$ (where a and b are both constants determined by the characteristics of the spark-ignition engine). Using this equation, the computing unit 24 then calculates an optimal ignition timing Y of the spark-ignition engine 10 in terms of the crank angle at that time, $K_M$ °CA. As already confirmed in Experiments 1, 2 and 3, the crank angle $K_M$ °CA corresponds to a minimal spark advance for best torque (MBT).

The control unit 28 controls the spark plug 26 in such a way that it will discharge at the time when the crank angle has reached $K_M$ °CA.

EXPERIMENT 4

A single-cylinder engine with a displacement of 403 cc (AVL type 530) was selected as a testing engine and furnished with the ignition timing control mechanism fitted on the spark-ignition engine 10 shown in FIG. 1.

The values of constants a and b in the equation $Y=aX+b$ for the testing engine were set at a=0.978 and b=0.66 since analysis of the graphs in FIGS. 4, 5 and 6 gave values equal to or near those values.

As in Experiment 1, pure products of six hydrocarbons, isooctane, benzene, toluene, 1-hexene, 2,4,4-trimethylpentene (DIB) and cyclohexane, were used as fuels. The engine was operated at 1,200 rpm, with the A/F ratio being set at the stoichiometric ratio or equivalence ratio of 1.0 and the air intake pressure at 660 mmHg.

Subsequently, the engine was controlled by the procedure described above so that the ignition timing would correspond to MBT. The results are listed in Table 1 in the columns "Experiment 4".

COMPARATIVE EXPERIMENT

The testing engine was operated under the same condition as in Experiment 4, except that the ignition timing was retarded by 8 °CA from MBT. The results are listed in Table 1 in the columns "Comparative Experiment".

As one can see from Table 1, the fuel consumption in Experiment 4 was smaller than in the Comparative Experiment whereas the thermal efficiency was improved in Experiment 4. The term "thermal efficiency" means the quantity of heat converted to work as divided by the quantity of heat supplied to the engine.

TABLE 1

| Fuel | Output (PS) | | Fuel consumption ($cm^3$/(MW · s)) | | Indicated thermal efficiency (%) | |
|---|---|---|---|---|---|---|
| | Ex. 4 | Comp. Ex. | Ex. 4 | Comp. Ex. | Ex. 4 | Comp. Ex. |
| iso-octane | 5.794 | 5.589 | 105.1 | 108.2 | 30.9 | 29.9 |
| benzene | 5.754 | 5.543 | 92.5 | 96.0 | 30.3 | 29.2 |
| toluene | 5.740 | 5.643 | 93.5 | 95.1 | 30.2 | 29.7 |
| DIB | 5.876 | 5.762 | 101.3 | 103.4 | 31.1 | 30.4 |
| cyclohexane | 5.742 | 5.591 | 95.8 | 98.4 | 30.5 | 29.7 |

Running conditions:
Engine Speed, 1,200 rpm
A/F Ratio, stoichiometric ratio (equivalence ratio=1.0)
Air Intake Pressure, 660 mmHg
Experiment 4: Ignited at MBT
Comparative Experiment: Ignited at 8 °CA behind MBT While the invention has been described in detail and with reference to specific embodiments thereof, it will be apparent to one of ordinary skill in the art that various changes and modifications can be made therein without departing from the spirit and scope thereof.

What is claimed is:

1. In a spark-ignition engine that has a cylinder and a crank connected to the piston in the cylinder and which converts the reciprocating motion of the piston to rotary motion via the crank, the improvement wherein said engine further includes:

an angle sensor for measuring the crank angle;

a combustion sensor for measuring the burned mass fraction of a fuel in the combustion chamber;

a computing unit for calculating the ignition timing of the spark-ignition engine on the basis of the measured crank angle and burned mass fraction by the following equation:

$Y=aX+b$ (where Y is the ignition timing expressed by the crank angle before top dead center; X is the difference between the crank angle at a reference burned mass fraction of the fuel injected into the cylinder and the crank angle at a burned mass fraction in the progress of combustion; a and b are constants determined by the characteristics of the spark-ignition engine); and a control unit for controlling the ignition timing of the spark-ignition engine on the basis of the calculated ignition timing.

2. A spark-ignition engine according to claim 1 wherein said combustion sensor is a pressure sensor which measures the pressure in the combustion chamber of the cylinder and wherein said computing unit calculates, from the relationship between the pressure in the combustion chamber and the burned mass fraction of the fuel and on the basis of the pressure as measure with said pressure sensor, the burned mass fraction of the injected fuel at the time of pressure measurement.

3. A spark-ignition engine according to claim 2 wherein said pressure sensor is a piezoelectric transducer which is either integral with the spark plug or in the form of a washer for the spark plug.

4. A spark-ignition engine according to claim 1 wherein the reference burned mass fraction of the fuel injected into the cylinder is set at 0% (igniting) and the burned mass fraction in the progress of combustion is set at 10%.

5. In a method for adaptive control on the ignition timing of a spark-ignition engine that has a cylinder and a crank connected to the piston in the cylinder and which converts the reciprocating motion of the piston to rotary motion via the crank, the improvement comprising the steps of:

measuring the crank angle with an angle sensor capable of crank angle measurement;

measuring the burned mass fraction of the fuel in the combustion chamber with a combustion sensor capable of burned mass fraction measurements;

calculating the ignition timing of the spark-ignition engine on the basis of the measured crank angle and burned mass fraction by the following equation:

$$Y = aX + b$$

(where Y is the ignition timing expressed by the crank angle before top dead center; X is the difference between the crank angle at a reference burned mass fraction of the fuel injected into the cylinder and the crank angle at a burned mass fraction in the progress of combustion; a and b are constants determined by the characteristics of the spark-ignition engine); and controlling the ignition timing of the spark-ignition engine on the basis of the calculated ignition timing.

6. A method for adaptive control on the ignition timing of a spark-ignition engine according to claim 5 wherein the reference burned mass fraction of the fuel injected into the cylinder is set at 0% (igniting) and the burned mass fraction in the progress of combustion is set at 10%.

* * * * *